Dec. 29, 1942.   L. L. LOVELL ET AL   2,306,993
DESULPHURIZATION OF HYDROCARBON OILS
Filed June 30, 1941
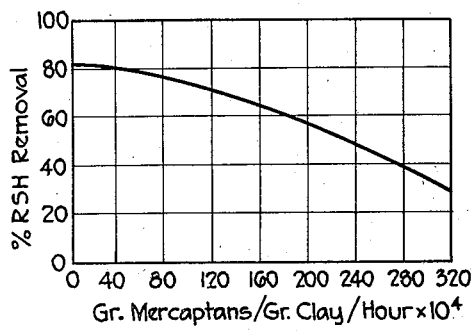
Fig. I
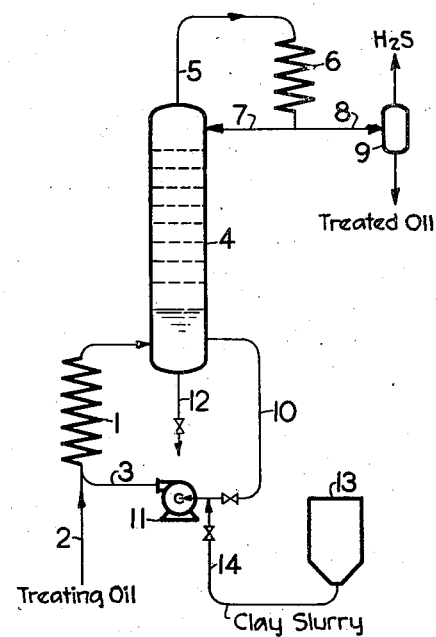
Fig. II
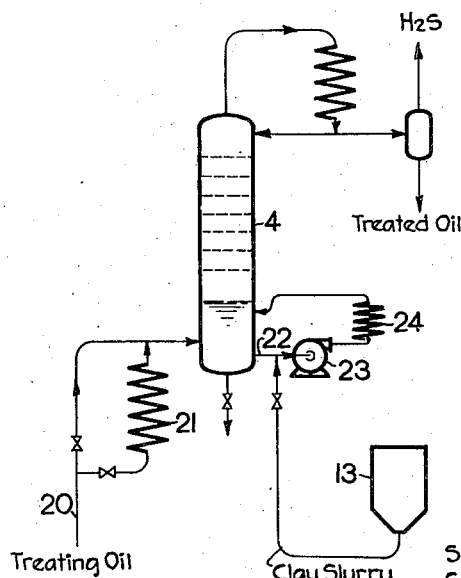
Fig. III
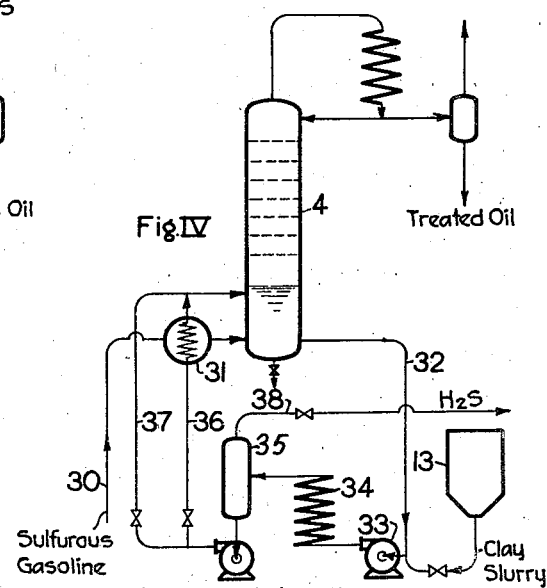
Fig. IV
Inventors: Lawrence L. Lovell
Parker Erwin Malson
Louis Frank Boullion
By their Attorney:

Patented Dec. 29, 1942

2,306,993

UNITED STATES PATENT OFFICE 2,306,993

DESULPHURIZATION OF HYDROCARBON OILS

Lawrence L. Lovell, Wood River, Parker Erwin Maison, East Alton, and Louis Frank Bouillon, Edwardsville, Ill., assignors to Shell Development Company, San Francisco, Calif., a corporation of Delaware Application June 30, 1941, Serial No. 400,364

13 Claims. (Cl. 196—26)

This invention relates to processes for desulphurizing hydrocarbon oils, and more particularly is concerned with a treatment of hydrocarbon oils with certain clays under conditions to effect a material reduction in the sulphur content of the oils.

It is already known that mercaptans contained in hydrocarbon oils can in part be broken down to H₂S and hydrocarbons by contacting the oils with clays at elevated temperatures. However, in the processes heretofore developed, the reduction in sulphur content was relatively small so that these processes are commercially unattractive unless carried out for some other primary purpose, such as decolorization, neutralization, stabilization, etc.

It is a purpose of this invention to provide a simple clay treating method which permits a degree of sulphur reduction which is much greater than has heretofore been possible by clay treatment alone. Another purpose is to carry out such treatment in a simple, inexpensive apparatus. Still another purpose is to continuously regenerate the clay so that it can be used over a long period of time with relatively little degeneration. Incidental purposes are improvement in color, stability of the treated oil, reduction in carbon residue and corrosivity, and, in the case of gasoline, improved octane number and lead susceptibility.

Our process consists essentially of contacting an oil containing organic sulphur compounds and particularly mercaptans with a slurry of an acid-activated clay suspended in a high-boiling hydrocarbon carrier oil, which carrier oil preferably has a low content of aromatics and petroleum resins, heating the resulting spent slurry to a temperature above 585° F. but below cracking, whereby the clay is regenerated, and treating further amounts of the sulphur-containing oil with the regenerated slurry.

Clays suitable for our purpose must have been treated or impregnated with an electrolyte-yielding compound of an inorganic, poly-oxy acid radical, preferably one which is relatively stable at elevated temperatures. Preferred acid radicals are sulphuric, selenic, phosphoric, phosphorous and iodic radicals. Sulphuric acid normally yields the most active clays.

Electrolyte-yielding compounds comprise free acids and salts. Among the suitable salts are particularly alkali metal salts. Certain other salts like aluminum sulphate, while usable, tend to cause cracking of hydrocarbons at relatively low temperatures and therefore are in general less desirable for our purpose. For ease of treating the clay, it is desirable that the electrolyte-yielding compounds be water-soluble so that clays may be activated by treatment with an aqueous solution of a compound, although colloidal aqueous suspensions of water-insoluble compounds may also be used. The resulting wet clay is separated from excess of aqueous activating solution or suspension, if any, and then is allowed to dry.

Any one of several different methods of activation may be suitable. Thus the clay may be washed or drenched with a relatively large amount of a suitable aqueous solution or suspension, excess liquid is removed, and the resulting wet clay is dried. Or else a relatively small amount of the solution may merely be sprayed onto the clay and dried. Different clays usually require different amounts of electrolyte-yielding compounds for optimum activity, as is well known from the art of preparing decolorizing clays by acid treatment of certain naturally inactive clays.

Suitable concentrations of activating solutions normally range from about 1%–30% of the radical-yielding compound in water.

Various types of decolorizing clays may be subjected to the activating treatment. Thus clays of the type of bentonites, e. g., montmorillonite, indianite, woodite, so-called Utah clay, etc., all of which become active decolorizing clays upon being leached with acids; or clays of the type known as Milwhite, or naturally active decolorizing clays, such as Florida or attapulgas clays may be used. If desired, we may use in our treatment a spent clay which previously had been employed for decolorizing raffinate oils produced by solvent extraction of hydrocarbon oils with a selective solvent for aromatic hydrocarbons, provided the clay was originally activated as described.

The oil used as the carrier in the slurry must be free from asphalt. It should preferably be substantially free of petroleum resins and should contain as small a proportion of aromatics as possible. For best results, its specific dispersion, which is an index of content of aromatics, should be below 115. In extreme cases, when using slurry oils of high resin and/or aromatic content, the desulphurization may, under unfavorable conditions, be practically nil, while under the same conditions a de-resined bright stock may give very effective desulphurization. Further, the oil should have a sufficiently high boiling range so that undue losses by distillation during regeneration are avoided. Oils particularly suited are solvent-extracted bright stock having resin contents below 5% and preferably below 3%, particularly those obtained from Mid-Continent or Pennsylvania heavy lubricating stocks by counter-current extraction with a selective solvent having preferential solvent power for aromatics and a liquid normally gaseous hydrocarbon, such as propane or butane, under conditions to remove substantially all of the resins and most, if not all, aromatic hydrocarbons.

Petroleum resins as herein defined are compounds absorbable on silica gel, which compounds are naturally associated with relatively heavy lubricating oil stocks. Such resins, as is known, have specific dispersions normally in excess of 200.

The hydrocarbon oil to be desulphurized, hereinafter referred to as the "treating stock" or "treating oil," also must meet certain requirements. It should be free from aromatic hydrocarbons which cannot be completely vaporized at the highest permissible treating temperature. In general, the oil should be vaporizable in its entirety at the highest permissible treating temperature; and it is desirable that there be a gap between the boiling temperatures of the highest boiling component of the treating oil and the lowest boiling component of the carrier oil to enable a clean separation between the two oils by fractional distillation.

At the time of contacting with the clay slurry, the treating oil may be in the liquid or vapor phase. In general, we prefer to introduce the treating oil into the contact zone as a liquid, and thereafter separating it by fractional distillation. However, under some circumstances, we may bubble vapors of the treating oil through the liquid clay slurry.

The permissible temperature of the treatment may vary from about room temperature up to incipient cracking temperature. Cracking may begin at temperatures from about 600°-700° F., the exact incipient cracking temperature varying somewhat with the type of treating stock and the type of clay used. In general, clays more heavily impregnated with electrolyte-yielding compounds cause cracking at relatively low temperatures. For reasons of substantially complete regeneration of the clay, we prefer to use clays which do not cause material cracking of hydrocarbons below about 650° F., as will be explained later.

The exact temperature employed in the contacting of the treating stock with the clay slurry usually is governed by practical considerations by taking into account the boiling temperature of the treating oil. Usually any temperature low enough to avoid cracking and high enough to permit complete vaporization of the treating oil and/or primary polymerization products is suitable.

Regeneration of the resulting spent clay slurry is accomplished by merely heating to a temperature above 585° F., and below that of incipient cracking. At temperatures substantially below 585° F., no regeneration of the clay takes place. If the desulphurization temperature is above 585° F., a separate regeneration step becomes unnecessary, desulphurization and regeneration of the clay taking place substantially simultaneously.

In the course of the regeneration, H₂S is developed, which normally is withdrawn together with the vapors of the treated oil. This liberated H₂S can easily be separated from the treated oil either by fractional condensation, or by washing with an alkaline liquid, etc.

It is because of the regeneration of the clay that the carrier oil should contain a low resin and aromatic content. Aromatics, and particularly resins, are absorbed by the clay in preference to most sulphur compounds, producing a protective coating which inactivates the clay for further desulphurization. On the other hand, the presence of a liquid oil during the reaction greatly accelerates the desulphurization, possibly because the desulphurization is dependent on a liquid absorption reaction, followed by a cracking of the absorbed liquid compounds to yield H₂S and hydrocarbons. In contact with the carrier liquid, the treating oil is at least partially in the liquid phase even above its boiling temperature, thus enabling the liquid absorption reaction to take place. Naturally the higher the treating temperature is above the boiling temperature of the treating oil, the smaller is the portion of the latter held in the liquid solution, and in consequence the slower and more incomplete is the reaction. On the other hand, since the quantity of adsorbed sulphur compounds is limited by the active surface of the clay, a relatively high ratio of clay to treating oil may be required, unless the surface of the clay is reactivated as soon as it has become saturated with adsorbed sulphur compounds. In the latter case, depending on the rate of regeneration, the ratio of clay to oil may be quite small, at least much smaller than may be necessary when employing separate adsorption and reactivation steps.

In the case of simultaneous absorption and regeneration, the ratio of clay to treating oil may range from about 5 to 25 pounds per barrel during the contact, and the ratio of treating oil to carrier oil may suitably range from about 1:1 to 10:1. Slurries of carrier oil containing in the neighborhood of about 30 to 70 pounds of clay per barrel are convenient to handle.

The effect of various clay concentrations on the degree of desulphurization is well illustrated by Fig. 1 of the accompanying drawing wherein percent mercaptan sulphur removal is plotted vs. various amounts of clay fed per time unit to the reaction zone, when treating a West Texas light fuel oil having a boiling range of 340°-560° F., at a temperature of about 600° F. As will be seen, within the range shown at high clay to sulphur ratio (low sulphur to clay ratios), the sulphur removal is relatively more complete.

For the reasons explained above, it is desirable, wherever possible, to carry out the treatment at a permissible temperature above 585° F., and, if necessary, employ superatmospheric pressures to raise the flashing temperature of the treating oil to within close range of the treating temperature. On the other hand, if the flashing temperature of the treating oil is very high, vacuum may be employed to enable substantially complete vaporization at a permissible treating temperature below that of cracking.

Because of the fact that the efficiency of the treatment is influenced by the difference between boiling temperature of a given sulphur compound and the reaction temperature maintained, it will be seen that the relatively low boiling sulphur compounds contained in an oil of wide boiling range are less readily destroyed than the higher boiling ones. For this reason, it may be desirable first to fractionally distill a given treating oil into several fractions of narrow boiling ranges, and treating each fraction separately, either at different temperatures, the lowest boiling fraction being treated at the lowest boiling temperature; or else at different pressures, in order to enable maintenance of treating temperatures above 585° F. for all fractions, the lightest fraction being treated at the highest pressure.

Oils which can successfully be desulphurized by our treatment range from gasoline distillates to light lubricating oils. Thus various naphthas, kerosene, distillate fuels, gas oils, light neutrals suitable for transformer oils, etc., may successfully be desulphurized. In many cases complete sweetening of sour oils results. Depending upon the nature of the stock treated, the life of the clay may be very long. As many as 50 barrels of distillate oil may be desulphurized per pound of clay before the clay is finally inactivated. Replacement of the clay may be continuous by gradually withdrawing a portion of the clay slurry and substituting an equal amount of fresh slurry; or else by batch, i. e., by replacing an entire clay charge when it is spent.

The degree of desulphurization varies with the type of sulphur compound present and on the temperature of the treatment. Mercaptans are most easily broken down. However, organic sulphides, thiophenes, thiophanes, etc., are also removed at least in part.

Losses of valuable hydrocarbons caused by the treatment are negligible, yields of treated oil being usually of the order of 99% or better.

In Figs. 2, 3 and 4 of the accompanying drawing, three illustrative flow diagrams are shown, representing different forms which our process may take.

Referring to Fig. 2, treating oils such as a sour fuel distillate oil enters heater 1 through line 2 from a source not shown. On the way to the heater, the oil is combined with a slurry of clay in a carrier oil contained in line 3, and the resulting mixture is heated in heater 1 to a temperature between about 585° and 650° C. The hot mixture enters column 4, in the lower portion of which a liquid body of clay slurry is maintained. This body by virtue of rapid vaporization of the treating oil or by employment of mechanical mixing is constantly in a state of violent agitation.

The upper portion of column 4 contains bubble trays, and the vapors of treated oil and hydrocarbons are refluxed to return to the slurry whatever portions of carrier oil may have evaporated. Vapors of treated fuel oil leave column 4 through line 5 and are condensed in condenser 6. A portion of the condensate is returned through line 7 to column 4 as reflux and the remainder goes through line 8 to separator 9 where H2S is separated from condensed oil.

Spent slurry is withdrawn from column 4 through line 10 and is returned by means of pump 11 through line 3 back to the heater 1 where it is regenerated and at the same time desulphurizes further amounts of the treating oil. A portion of the spent clay slurry may be discarded from the bottom of column 4 through line 12, in which case an equal amount of fresh slurry is admitted from tank 13 through line 14 to pump 11.

In the arrangement of Fig. 3, the treating stock enters column 4 (which is identical with column 4 described in connection with Fig. 2) through line 20 from a source not shown, if desired, after passage through preheater 21. The temperature of the treating oil at the point of entry into the bottom of column 4 is preferably such that this oil is substantially in the liquid phase.

A body of liquid containing suspended clay is maintained in the lower portion of column 4, the point of entrance of the treating stock being below the liquid level.

The temperature of the body of liquid is kept high enough so that treating stock entering it is immediately flash vaporized. This temperature may be maintained, for example, by continuously withdrawing a stream of the liquid from the bottom of column 4 through line 22 and pumping it by means of pump 23 through heater 24 back to the tower 4, re-entering it preferably at some point below the liquid level.

Means should be provided to insure thorough contact between the treating stock and the liquid slurry in the bottom of column 4. The time of contact from the moment the treating stock enters the column until the vapors emerge above the liquid level is normally quite short, and therefore it is necessary to provide for intimate contact between the treating oil and the catalyst slurry. Thus, for example, if the cross-section of column 4 is circular, the treating oil may enter tangentially. Baffles designed to break the resulting circular motion will greatly increase the thoroughness, as well as the time, of the contact.

Means for disposing the resulting vapors and for discarding spent clay suspension and replacing it by fresh slurry are the same as those shown for Fig. 2.

The arrangement of Fig. 4 is particularly adapted for the treatment of relatively light oils such as gasoline distillates containing organic sulphur compounds. Thus a gasoline to be treated enters the bottom of column 4 through line 30 and heat exchanger 31 from a source not shown. A body of liquid slurry is maintained in the lower portion of column 4 which is the same as described in connection with Figs. 2 and 3. The temperature of this liquid is maintained high enough, but preferably not much above, that to effect complete flash vaporization of the gasoline which is discharged into it. A portion of the slurry is continuously withdrawn from the bottom of column 4 through line 32 by pump 33, is passed through heater 34 where it is heated to a temperature between 585° and 650° F. and is discharged into separator 35. $H^2S$ is liberated at the high temperature and is discarded through top line 38, while regenerated clay slurry is returned to the lower portion of column 4 either through line 36 and heat exchanger 31, or else through by-pass line 37.

It was found that for a given set of treating conditions and for a given treating stock the amount of sulphur removed is usually a definite percentage of the original sulphur content. This fact is illustrated in Fig. 1, which was discussed earlier. Upon re-running an oil once treated, it is usually possible to further reduce the sulphur content by a similar percentage calculated on the sulphur content of the once treated oil. Therefore, by repeating the treatment, several times in succession, it is frequently possible to obtain sweet products from highly sour starting materials. Thus, if desired, the treating stock may be passed through a series of treating stages each being a unit such as illustrated in Figs. 2–4. If desired, the vapors produced in one stage may be introduced into a subsequent stage without intermediate condensation, although in general we prefer to condense the treating material between the several stages as by suitable heat exchange.

The following examples further illustrate our invention:

Example I

A No. 1 raw West Texas fuel oil, boiling range 340°–550° F., having an average mercaptan sulphur content between .078%–.088%, was mixed with a hot slurry of sulphuric acid-activated bentonite (Filtrol) suspended in a transformer oil. The resulting mixture was then passed into a flash pot heated by a coil through steam of 800° F. was passed. In the flash pot the fuel oil was vaporized while clay slurry, which had a liquid temperature of about 600° F., remained behind and was recirculated.

The transformer oil had a viscosity of 75 Saybolt Universal seconds at 100° F. and a specific dispersion of 106.

The slurry contained between 50–60 pounds of clay per barrel.

The vaporized fuel oil was condensed. Samples taken at various intervals were found to have mercaptan sulphur contents between .016% to .028%.

Example II

A West Texas No. 1 straight run fuel oil was mixed with a slurry of sulphuric acid activated bentonite suspended in solvent extracted lubricating oil distillate of 500 Saybolt Universal viscosity at 100° F., specific dispersion 110. The mixture was passed through a heater to a flash pot. The outlet heater temperature was 625°–650° F. The sour oil was flash vaporized, vapors were condensed, and the condensate was washed with aqueous 5% NaOH solution to remove $H_2S$.

The remaining slurry containing about 35 pounds clay per barrel was recirculated.

The ratio of clay slurry to sour oil was varied during the experiment to result in mixtures containing between about 5–20 pounds of clay per barrel.

The experiment was terminated when more than two barrels of fuel had been treated per pound of clay. At this point, the clay showed no sign of lowered activity, indicating that the test could have been continued indefinitely.

The yield of treated fuel oil was better than 99% of the feed.

Comparative data of the properties of treated and untreated fuel oil are tabulated below:

|  | Untreated | Treated |
|---|---|---|
| A. S. T. M. boiling range | 340°–550° F. | Same |
| Total sulphur | .5 | .35 |
| Mercaptain sulphur | .08 | .025 |
| Carbon residue of 10% distillation bottoms [1] | .12 | .01 |
| Copper percolation corrosion mg./150 cc. of oil [1] | 75 | 8 |

[1] After doctor sweetening.

Example III

Range fuel oil was mixed with a slurry of clay suspended in a duosol extracted bright stock having a viscosity at 210° F. or 150 seconds. The clay was an originally acid-activated bentonite which had been utilized for decolorizing solvent extracted lubricating oil raffinates, thereby becoming spent.

The amount of clay in the mixed oils was about 10–12 pounds per barrel. The mixture was heated to between 605° and 615° F., whereupon the fuel oil was vaporized. The vapors were condensed and the condensate was washed with aqueous 5% NaOH solution. Residual slurry was returned for treating further amounts of fuel oil.

The mercaptan sulphur content of the fuel was lowered from .056% to about .01%.

We claim as our invention:

1. Process for desulphurizing a normally liquid hydrocarbon distillate containing organic sulphur compounds, comprising contacting said distillate with a liquid slurry of an agent consisting essentially of clay in a hydrocarbon carrier oil at a temperature above that required for flash vaporization of said distillate and below that of incipient cracking under the conditions of the process, heating the resulting slurry to a temperature between 585° F., and said incipient cracking temperature, whereby $H_2S$ is liberated, and separating said distillate and said $H_2S$ in vapor form from said liquid slurry, said oil having a specific dispersion not above 115 and a content of resins below about 3%, and being free from asphalts and substantially non-volatile at said temperature of heating, and said clay having been activated by treatment with an electrolyte-yielding compound of an inorganic poly-oxy acid radical.

2. The process of claim 1 wherein said radical is a sulphuric acid radical.

3. The process of claim 1 wherein said clay has been activated by treatment with sulphuric acid.

4. The process of claim 1 wherein said carrier oil is a solvent extracted bright stock.

5. The process of claim 1 wherein said clay is a spent clay from the decolorization of a raffinate oil produced in the extraction of hydrocarbon oils with selective solvents for aromatics.

6. Process for desulphurizing a normally liquid hydrocarbon distillate containing organic sulphur compounds, comprising contacting said distillate with a liquid slurry of an agent consisting essentially of clay in a hydrocarbon oil at a temperature above that required for a flash vaporization of said distillate, above 585° F., and below incipient cracking temperature under the conditions of the process, whereby $H_2S$ is liberated, and separating said distillate and said $H_2S$ in vapor form from said liquid slurry, said oil having a specific dispersion not above 115 and a content of resins below about 3%, and being free from asphalts and having an initial boiling point above said temperature of contact, and said clay having been activated by treatment with an electrolyte-yielding compound of an inorganic polyoxy acid radical.

7. The process of claim 6 wherein said slurry contains from 30–70 pounds clay per barrel and the ratio of said distillate to said oil is between 1:1 to 1:10.

8. The process of claim 6 wherein said contact temperature is between 585° and 650° F.

9. Process for desulphurizing a normally liquid hydrocarbon distillate containing organic sulphur compounds, comprising mixing said distillate in the liquid form with a liquid slurry of an agent consisting essentially of a clay in a hydrocarbon oil to produce a liquid temperature having a temperature below 585° F., heating said mixture to a temperature above 585° F., and below cracking temperature under the conditions of the process to vaporize said distillate, whereby $H_2S$ is liberated, said oil having a specific dispersion not above 115 and a content of resins below about 3%, and being free from asphalts and substantially non-volatile at said heating temperature, separating the resulting vapors from the residual liquid slurry and returning the latter for further mixing with said distillate, said clay having been activated by treatment with an electrolyte-yielding compound of an inorganic poly-oxy acid radical.

10. Process for desulphurizing normally liquid hydrocarbon distillate containing organic sulphur compounds comprising introducing said distillate while in the liquid form into a liquid slurry of an agent consisting essentially of clay in a hydrocarbon oil maintained at a temperature above 585° F. and below incipient cracking temperature conditions of the process to flash vaporize said distillate, and separating the resulting vapors from the slurry, said oil having a specific dispersion not above 115 and a content of resins below about 3%, and being free from asphalts and substantially non-volatile at said temperature, and said clay having been activated by treatment with an electrolyte-yielding compound of an inorganic poly-oxy acid radical.

11. The process of claim 1 wherein said distillate is a range fuel oil.

12. The process of claim 1 wherein said distillate is a gasoline distillate.

13. The process of claim 1 wherein said distillate is a kerosene distillate.

LAWRENCE L. LOVELL.
PARKER ERWIN MALSON.
LOUIS FRANK BOULLION.